Figure 1:
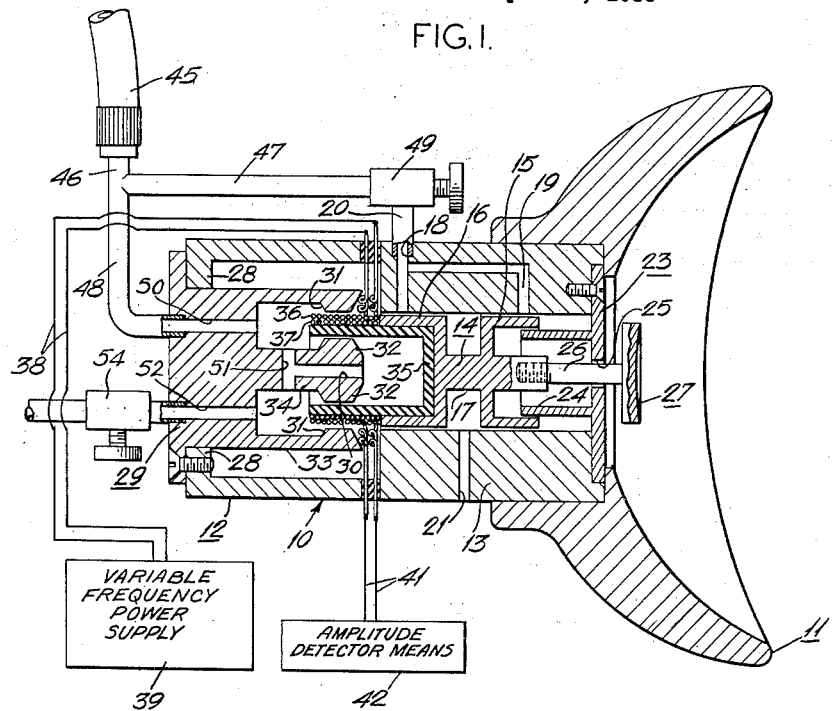

Dec. 25, 1962 K. SITTEL 3,070,087
TONOMETER
Filed Sept. 29, 1959

INVENTOR:
KARL SITTEL
BY Howson & Howson
ATTYS.

United States Patent Office 3,070,087
Patented Dec. 25, 1962

3,070,087
TONOMETER
Karl Sittel, Philadelphia, Pa., assignor to The Franklin Institute, Philadelphia, Pa., a corporation of Pennsylvania
Filed Sept. 29, 1959, Ser. No. 843,265
7 Claims. (Cl. 128—2)

This invention relates to a novel method of measuring intraocular pressure. This invention also relates to tonometers, instruments for measuring the intraocular pressure.

Various diseases of the eye, such as glaucoma, are caused by the build-up of excessive intraocular pressure from the fluids within the eye. In order to measure this intraocular pressure as a part of the diagnosis of such diseases, various techniques have been developed and many of these have employed a variety of instruments known as tonometers. Most tonometers, including the one of the present invention, depend upon an imposed movement some property of which is measured to ascertain information about intraocular pressure. A number of such devices are in common current usage, but each of these devices is subject to certain deficiencies.

The type of instrument most widely used today is the impression tonometer, of which there are a number of varieties. This instrument has a small flat or curved plate which is brought into direct contact with the cornea of the eye flattening it out over the area of contact. Then, a little plunger indents the flattened cornea to a certain depth and the amount of indentation is recorded. From this indentation intraocular pressure is determined using a table or graph based on experience. The method of this technique is generally known as tonometry.

Another possible use of the impression tonometer for indication of glaucoma is based on rate of change of pressure in a situation where there is outflow of aqueous liquid under the influence of an outside pressure applied to the eye. This technique is known as tonography and in some cases is regarded as more reliable than tonometry.

Both of the favored methods of the prior art require that the eye be anesthetized. The handling of a tonometer requires skill and must be done by a doctor. Instruments of this type are therefore not suitable as a tool for mass screening for glaucoma. The present invention, by contrast, is capable of use on an unanesthetized eye with the eyelid closed and can be used without danger by relatively less skilled technicians.

The method of the present invention comprises supporting a member by means which is essentially frictionless in contact with the eye or eye covering of a subject, causing that member to move at selected frequencies, and measuring the amplitude of vibration at those frequencies by plotting or comparing the amplitudes at various frequencies. The frequency of the force inducing the maximum amplitude of vibration can be ascertained and this frequency will be indicative of the pressure within the eye. Moreover, the rapidity with which the amplitude changes with the change of the frequency can be ascertained with this rapidity is indicative of the mechanical properties of the eye.

In order to accomplish this method, in accordance with the present invention, a novel tonometer is preferably employed. This tonometer has a frame including a portion adapted to be held against a portion of a subject's head surrounding his eye and a housing including a piston support. A piston is supported by said piston support and adapted to move relative to the frame inwardly and outwardly toward and away from the subject's eye. A plate is supported on the end of the piston and positioned to press against the subject's eye or eye covering when the proper frame portion is held against the portion of the subject's head surrounding the eye. Drive means for producing oscillatory movement of the piston causes the plate to oscillate against the eye.

In preferred embodiments, the drive means is electromagnetic and preferably consists of a fixed permanent magnet and a movable coil. Likewise, electromagnet pickup or detection means may be employed and may be of the same construction, in fact using the same fixed permanent magnet.

Figure 2:
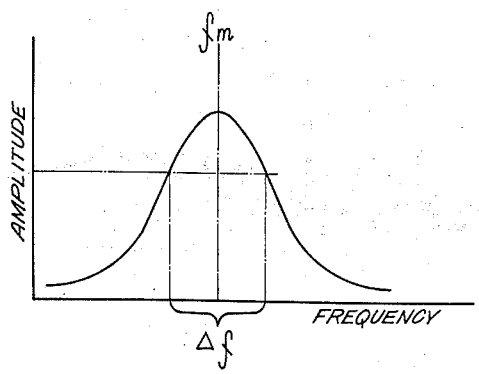

A better understanding may be had by reference to the accompanying drawings, wherein FIG. 1 illustrates in section the mechanical structure of a preferred form of tonometer according to the present invention with electric circuit elements schematically represented; and FIG. 2 represents a typical amplitude response curve showing change of frequency plotted against the amplitude of vibration.

Referring to FIG. 1, the tonometer shown employs a frame generally designated 10 including a socket 11, the portion of the frame which is adapted to be held against a portion of the subject's head surrounding his eye. Also part of the frame is a hollow housing 12 having a piston support region which advantageously is a thickened wall area 13 having a relatively small diameter bore which accommodates a piston structure generally designated 14 with a predetermined peripheral clearance. The piston, as illustrated, may have cylindrical cups 15 and 16 oriented to face opposite directions and joined by an intermediate reduced diameter region 17. All of these parts are intended to normally lie principally within the cylindrical bore of the piston-supporting portion 13. The piston is illustrated in an operative position and in this position it can clearly be seen that the air inlet ducts 18 and 19 from a common supply duct 20 channel a supply of air under pressure as a lubricant or buoyant means between the side walls of the bore in piston-supporting region 13 and the outer walls of cups 15 and 16. Such air effectively provides a frictionless bearing for the conditions of operation of the tonometer. The geometry is such that at least some air tends to flow inwardly to the region surrounding the reduced diameter portion 17 of the piston and thence outwardly through duct 21 to the atmosphere. Closing the housing 12 at the end to which the socket 11 is affixed is a plate 23 which may be fixed in place within a recess in the end of the thickened side walls 13, using screws or other appropriate holding means. Projecting inwardly from wall 23 is a tubular member 24 of such diameter that it telescopes with small clearance within the cup 15 of piston 14. The arrangement or orientation of these pieces is such that member 24 serves as a guide means for preserving the alignment of the piston as well as forming a baffle against the outflow of air through a central opening 25 in plate 23. Before air from conduit 19 leaves through the opening 25, it must flow outwardly around the lip of the cup 15 and back inwardly around the end of the baffle 24, which tends to inhibit such flow.

Opening 25 serves the purpose of permitting free passage of stem member 26 which forms an extension of piston 14 to which the plate 27 is affixed. Plate 27 preferably is a small disk which may be flat or concave as shown and is intended to press against the eye or eye covering of the subject when the socket 11 is in place around the eye. The relative dimensions of these elements, of course, must be designed to take into consideration the physical characteristics of the individual undergoing the examination. Some flexibility in accommodating different individuals is provided the particular biasing means employed here, which leaves the piston free to assume any necessary rest position while maintaining a selectable constant contact pressure. The biasing means serves to urge the plate 27 against the eye or eye covering of the subject to provide a rest position for the piston. This is preferably done by means shown in FIG. 1. As seen in FIG. 1, closure 29 is adapted to provide an overlapping joint with a flanged end portion 28 of the housing 12 in order to close the end of the housing opposite from that of closure plate 23 and is held in place by screws or other appropriate means. The cup 16 is pressurized through the duct 30 which connects to the air chamber 51. The air pressure in chamber 51 is maintained constant by maintaining a constant pressure drop between air inlet duct 50 and air outlet duct 52 through end closure 29. Outlet duct 52 provides a needle valve 54 by which the pressure drop and hence the bias pressure against the eye can be adjusted to any preferred value. The pressure within cup 16 tends to press the entire piston structure 14, including the plate 27, toward the subject's eye. Moreover, the pressure thus imposed holds the plate 27 against the eye slightly depressing it to a neutral position relative to which vibration can occur.

In practice, the end closure 29, or at least the inner part of it, is a magnet, preferably a permanent magnet. This permanent magnet is of somewhat complex shape in order to provide pole pieces 31 and 32 which are supported on tubular and cylindrical extensions 33 and 34, respectively. Extending into the gap between the pole pieces and movable therein is a tubular telescoping extension of the piston 14, and specifically cup member 16. This extension is preferably part of a cup 35 of insulating material snugly accommodated within cup 16 and extending beyond the end of cup 16 and into the gap between the pole pieces 31 and 32. Wrapped helically around the outer surface of the cup 35 are a pair of windings 36 and 37 which are adapted to extend beyond the pole pieces on each side of the gap so that no matter in what position the piston is located, there will always be a portion of each of them lying within the gap. Being helically wound on the side walls of cup 35, the conductors of coils 36 and 37 will cut the magnetic flux lines extending between the pole pieces whenever the piston moves inwardly and outwardly relative to the eye. The drawing is highly schematic in that the windings cannot be adequately illustrated but it will be understood that windings 36 and 37 are separate windings of fine wire, each being a separate coil insulated from the other. Winding 36 is preferably the drive coil and is connected by suitable leads 38 to a variable frequency power supply 39 which supplies the power to drive the piston into oscillatory motion by motor action. The frequency of oscillation of the piston is changed by varying the frequency of power supplied.

The coil 37 is connected by suitable leads 41 to an amplitude measuring device 42. The coil 37 cuts lines of force as coil 36 drives it relative to the poles 31, 32 and electromotive force is generated therein by generator action. The amount of this electromotive force is proportional to the amplitude of vibration and hence a suitable voltage measuring instrument may be used to measure amplitude and may be calibrated in terms of amplitude of vibration.

The air required for frictionless bearing support and biasing may be supplied through suitable hose 45 connected to a manifold 46 and then to distribution tubing 47, 48. Flow to the individual ducts 20 and 30 may be regulated by manually operated valves 49 and 54.

In operation, the valve 49 is adjusted to regulate the flow of air through duct 20 and ducts 18 and 19 to the bearing surfaces of piston 14 until frictionless support is provided. The socket 11 is placed against the head of the wearer in the region surrounding the eye. Valve 54 is then adjusted in order to assure the proper flow of air to achieve the desired bias pressure of the piston urging member 27 against the eye or eye covering. This causes the piston to move against the eye or eyelid and exert pressure upon it. Thereafter, the power supply is energized and the frequency of the power supplied varied over an appropriate range. At each frequency, the velocity amplitude of vibration is measured by amplitude measuring means 42 and, consequently, a curve, such as that shown in FIG. 2 may be plotted. The curve is a typical resonance curve. Of interest in the diagnosis of glaucoma and other disorders are the frequency of maximum amplitude $f_m$ and the so-called "Q-factor," the "half bandwidth" indicated $\Delta f$, which is the bandwidth at a predetermined proportion of maximum amplitude. The frequencies normally investigated range from 100 to 200 cycles per second.

It will be apparent that in accordance with the method of the present invention great modification in structure can occur. The device illustrated is one which is presently preferred but modifications in its structure are possible.

It will be apparent from the above that one of the advantages of the present invention is that it may be applied against the lid of a closed eye by one not skilled in the medical arts. By use of a generator which automatically sweeps over the frequencies of interest and by use of automatic recording means whereby amplitude is recorded automatically as frequency is changed, preferably being automatically plotted, an accurate record of a particular subject's intraocular pressure can be made in an extremely short period of time. All of these factors combine to make mass screening for glaucoma and other eye diseases in which intraocular pressure takes a part quite feasible using the present invention.

In addition to the modifications already described, many others within the scope of the claims will occur to those skilled in the art. Also such modifications within the scope and spirit of the claims are intended to be within the scope of the present invention.

I claim:

1. An oscillatory optical tonometer comprising a reference frame including a housing, a piston in said housing, essentially frictionless support means for the piston on the housing permitting essentially free axial movement of the piston, a plate on one end of the piston for indenting the cornea or eye lid and of sufficient area relative thereto to distribute pressure so that the eye will not be damaged, means urging the piston toward the eye with sufficient force that the plate remains in contact with the cornea throughout each oscillatory cycle, drive means for imposing upon the piston an oscillatory movement against the cornea at such a frequency that an appreciable vibration response of the cornea-piston combination occurs, and means for detecting the response of the cornea piston combination.

2. The tonometer of claim 1 in which the essentially frictionless support means for the piston is air bearings.

3. The tonometer of claim 1 in which the drive means for imposing the oscillatory movement upon the piston is electromagnetic means including a coil and a magnet one supported on the reference frame and the other supported on the piston.

4. The tonometer of claim 1 in which the means for detecting the response of the cornea-piston combination is electromagnetic means including a coil and a magnet one supported upon the reference frame and the other supported upon the piston.

5. The tonometer of claim 1 in which the means urging the piston toward the eye is an air pressure supply between the piston and the housing and urging the piston toward the eye.

6. The method of determining the pressure in a subject's eye comprising urging against the eye or eyelid a member which is supported essentially frictionlessly at a sufficient pressure to deflect the cornea and remain in contact therewith throughout oscillations of the cornea, oscillating the member held against the eye toward and away from the cornea at selected friquencies within the range of frequencies which cause appreciable vibration response of the cornea-member combination, and measuring the amplitude of oscillation at the various frequencies whereby the frequency of maximum amplitude, which is indicative of pressure within the eye, may be determined.

7. The method of determining the pressure in a subject's eye comprising urging against the eye or eyelid a member which is supported essentially frictionlessly at a sufficient pressure to deflect the cornea and remain in contact therewith throughout oscillations of the cornea, oscillating the member held against the eye toward and away from the cornea at selected frequencies within the range of frequencies which cause appreciable vibration response of the cornea-member combination, and measuring the amplitude of oscillation at various frequencies over at least the half band width in order to determine the "Q" factor of the amplitude versus frequency curve.

References Cited in the file of this patent

UNITED STATES PATENTS

| | | |
|---|---|---|
| 2,415,310 | Summerville et al. | Feb. 4, 1947 |
| 2,622,439 | Copper | Dec. 23, 1952 |
| 2,742,035 | Hancock et al. | Apr. 17, 1956 |
| 2,836,173 | Uemara et al. | May 27, 1958 |